US006192742B1

(12) United States Patent
Miwa et al.

(10) Patent No.: US 6,192,742 B1
(45) Date of Patent: Feb. 27, 2001

(54) MORE RELIABLE LEAKAGE DIAGNOSIS FOR EVAPORATED GAS PURGE SYSTEM

(75) Inventors: Makoto Miwa; Yoshihiro Majima, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/190,243

(22) Filed: Nov. 13, 1998

(30) Foreign Application Priority Data

Nov. 17, 1997 (JP) ........ 9-314733
May 19, 1998 (JP) ........ 10-136235

(51) Int. Cl.[7] ........ G01M 3/04; F02M 33/02
(52) U.S. Cl. ........ 73/40; 123/520
(58) Field of Search ........ 73/40, 118.1; 123/520

(56) References Cited

U.S. PATENT DOCUMENTS 5,295,472 * 3/1994 Otsuka et al. ........ 123/520
5,297,529 * 3/1994 Cook et al. ........ 123/520
5,317,909 6/1994 Yamada et al. .
5,411,004 * 5/1995 Busato et al. ........ 123/520
5,542,397 * 8/1996 Takahata et al. ........ 123/520
5,575,265 * 11/1996 Kurihara et al. ........ 123/520
5,699,775 * 12/1997 Azuma ........ 123/520
5,763,764 * 6/1998 Mieczkowski et al. ........ 73/40
5,898,108 * 4/1999 Mieczkowski et al. ........ 73/118.1

FOREIGN PATENT DOCUMENTS 2-130256 5/1990 (JP) .
5-10215 1/1993 (JP) .

* cited by examiner

*Primary Examiner*—Hezron Williams
*Assistant Examiner*—Jay L. Politzer
(74) *Attorney, Agent, or Firm*—Nixon & Vanderhye P.C.

(57) ABSTRACT

To perform leak diagnosis, when it is determined (during engine idling) that leakage exists in the purge system air is reintroduced into a purge system. Then, determination of leakage existence is stopped. Accordingly, erroneous diagnosis caused by opening the filler cap during engine idling is prevented, and reliability of leakage diagnosis is improved.

16 Claims, 11 Drawing Sheets

MORE RELIABLE LEAKAGE DIAGNOSIS FOR EVAPORATED GAS PURGE SYSTEM

BACKGROUND OF THE INVENTION

1. Field of the Invention

The present invention relates to leakage diagnosis in an evaporated gas purge system for diagnosing existence or absence of leakage (pressure leakage) of an evaporated gas purge system for purging (discharging) evaporated gas caused by evaporation of fuel in a fuel tank to an intake pipe of an internal combustion engine.

2. Description of Related Art

Conventionally, in an evaporated gas purge system, in order to prevent evaporated gas generated from inside of a fuel tank from leaking out to the atmosphere, the evaporated gas is adsorbed in a canister via an evaporated gas passage at the inside of the fuel tank, a purge control valve is installed midway of a purge passage for purging evaporated gas adsorbed in the canister to an intake pipe of an internal combustion engine and opening and closing of the purge control valve is controlled in accordance with an operating state of the internal combustion engine by which, the flow rate of the evaporated gas purged from the canister to the intake pipe is controlled. In order to prevent extensive leakage of evaporated gas from the evaporated gas purge system to atmosphere, the leakage of the evaporated gas needs to be detected at an early stage.

Hence, as disclosed in, for example, Japanese Patent Application Laid-Open No. Hei-5-125997, a purge system, in which existence or absence of leakage is diagnosed based on pressure in the purge system or an amount of pressure change after atmosphere or negative pressure of an intake pipe is introduced and hermetically sealed in the purge system including a fuel tank and a canister, is known.

The leakage diagnosing operation may be carried out during idling of an engine and therefore, the filler cap of the fuel tank may be opened for supplying fuel or the like when leakage diagnosis is being carried out by which the purge system may be opened to the atmosphere during leakage diagnosing operation. That is, when fuel supply is carried out while running an engine, the filler cap may be opened (filler opening may be opened) during leakage diagnosing operation.

When the filler cap is opened and the purge system is opened to the atmosphere during leakage diagnosing operation, the purge system is erroneously diagnosed as having leakage even when the system is normal from the start since the system is brought into a state the same as that when a large hole is opened in the purge system.

In order to prevent such an erroneous diagnosis, as disclosed in Japanese Patent Application Laid-Open No. Hei-9-137756, there is a known system in which a fuel temperature sensor is installed to a fuel tank, existence or absence of lowering of fuel temperature is monitored and when the fuel temperature is lowered, it is determined that fuel is being supplied and leakage diagnosis is prohibited.

However, according to this related art, the fuel temperature sensor needs to be installed at the fuel tank.

Further, when the temperature difference between temperature of fuel in the fuel tank and temperature of the supplied fuel is small, it cannot be determined that fuel is being supplied. Furthermore, if the leakage diagnosis is finished after the filler cap is opened and before the fuel supply is started, it is not determined that fuel is being supplied, and accordingly, the system is erroneously diagnosed without canceling the diagnosed result even when it is diagnosed that the leakage is caused by opening the filler cap. After all, according to the determination of fuel supply by fuel temperature, an erroneous diagnosis caused by opening the filler cap may not be prevented, and reliability of leakage diagnosis cannot be improved sufficiently.

SUMMARY OF THE INVENTION

The present invention is made in light of the foregoing problems, and it is an object of the present invention to provide leakage diagnosis device for an evaporated gas purge system which is capable of preventing erroneous determination of leakage when leakage determination is carried out while a vehicle is not running (the vehicle is stopped). Particularly, it is an object of the present invention to provide leakage diagnosing for an evaporated gas purge system capable of preventing erroneous diagnosis caused by opening a filler cap of a fuel tank, capable of improving the reliability of leakage diagnosis, and reducing the number of parts and integration steps.

According to an exemplary leakage diagnosing device for an evaporated gas purge system of the present invention, leakage diagnosing means reintroduces air into a purge system when it is determined during idling of an engine that leakage exists in the purge system. Then, the leakage diagnosing means further cancels its determination of leakage existence according to the pressure of the purge system after starting the reintroduction of air.

If it is determined that there is a leakage in the purge system when the engine is in an idling state (that is, a situation where the filler cap is likely to be opened), the pressure reintroducing operation for introducing air into the purge system is carried out again, and any diagnosis result indicating the existence of leakage is canceled unless still indicated according to the inner pressure of the purge system. Accordingly, erroneous diagnosis caused by opening the filler cap is prevented, and reliability of leakage diagnosis is improved.

According to another aspect of the leakage diagnosing device for an evaporated gas purge system of the present invention, when leakage diagnosing means determines while a vehicle is stopped that leakage exists in a purge system, the leakage diagnosing means executes the leakage diagnosis again while the vehicle is running.

Therefore, even if it is determined that there is a large amount of leakage after execution of the leakage determination when the vehicle is not running and a fuel supply port of a fuel tank is opened, it is possible to confirm whether there is real leakage because the second leakage determination is carried out while the vehicle is running after closing the fuel supply port. Accordingly, an erroneous leakage determination is prevented, and the reliability of leakage determination is improved.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
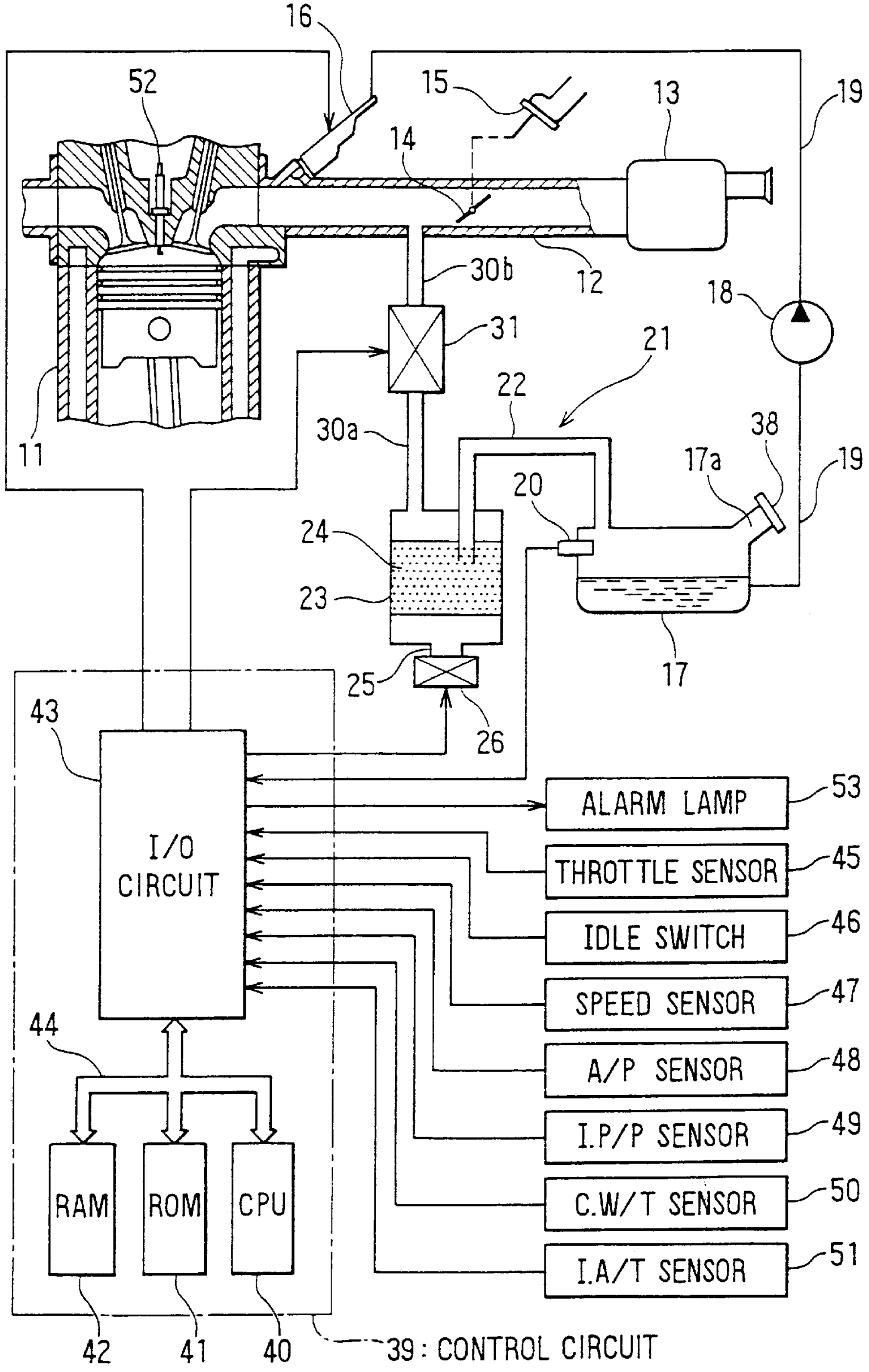
FIG. 1 is a schematic illustration showing a total system applicable to a first through fourth embodiments of the present invention.

A first embodiment of the present invention is shown in FIGS. 1, 2, 3, 4, 5A, 5B and 5C. Total system for all embodiments of the present invention is illustrated in FIG. 1. An air cleaner 13 is installed on the upstream side of an intake pipe 12 of an engine 11 and air which has passed through the air cleaner 13 is sucked to respective cylinders of the engine 11 via a throttle valve 14. An opening degree of the throttle valve 14 is adjusted by a depression amount of an acceleration pedal 15. Further, the intake pipe 12 is installed with a fuel injection valve 16 for each of the cylinders. Fuel (gasoline) in a fuel tank 17 is transferred to each of the fuel injection valves 16 via a fuel pipe 19 by a fuel pump 18. The fuel tank 17 is installed with a pressure sensor 20 of a semiconductor pressure sensor or the like for detecting pressure in the fuel tank 17.

Next, an explanation will be given for the constitution of a purge system 21. The fuel tank 17 is connected with a canister 23 via a communication pipe 22. An adsorber 24 of active carbon or the like for adsorbing evaporated gas is contained in the canister 23. An atmosphere communication pipe 25 for communicating with the atmosphere is installed at a bottom face portion of the canister 23 and a canister closure valve 26 is attached to the atmosphere communication pipe 25.

The canister closure valve 26 is constituted by an electromagnetic valve and in an OFF state, the canister closure valve 26 is maintained in a valve opening state by a spring (not illustrated) and the atmosphere communication pipe 25 of the canister 23 is maintained in a state where it is opened to the atmosphere. Further, when predetermined voltage (for example, 6 V or higher) is applied on the canister closure valve 26, the canister closure valve 26 is switched to a valve closing state and the atmosphere communication pipe 25 is brought into a closure state.

Meanwhile, purge passages 30*a* and 30*b* for purging (discharging) evaporated gas adsorbed to the adsorber 24 to the intake pipe 12 are installed between the canister 23 and the intake pipe 12 and a purge control valve 31 for adjusting a purge flow rate is installed between the purge passages 30*a* and 30*b*. The purge control valve 31 is constituted by an electromagnetic valve.

A solenoid coil (not illustrated) of the purge control valve 31 is applied with voltage by a pulse signal and by adjusting a ratio of a pulse width to a period of the pulse signal (duty ratio), a ratio of valve opening time to a period of opening and closing the purge control valve 31 is adjusted by which the purge flow rate of the evaporated gas from the canister 23 to the intake pipe 12 is controlled.

Further, a fuel supply port 17*a* of the fuel tank 17 is mounted with a filler cap 38 having a relief valve and the relief valve is opened and pressure is relieved when inner pressure of the fuel tank becomes an inner pressure exceeding −40 mmHg through 150 mmHg (relief pressure). Accordingly, pressure in a section from the fuel tank 17 to the canister 23 is always restrained to a pressure within a range of the relief pressure.

Next, an explanation will be given of the constitution of a control system. A control circuit 39 is constituted by connecting CPU 40, ROM 41, RAM 42, an input and output circuit 43 and so on to each other via a common bus 44. Further, the input and output circuit 43 is connected with various sensors for detecting an engine operating state such as a throttle sensor 45, an idle switch 46, a vehicle speed sensor 47, an atmospheric pressure sensor 48, an intake pipe pressure sensor 49, a cooling water temperature sensor 50, an intake air temperature sensor 51 and so on. Based on signals inputted from the various sensors via the input and output circuit 43 as well as programs, data and the like stored in ROM 41 or RAM 42, fuel injection control, ignition control, evaporated gas purge control, abnormality diagnosis of the evaporated gas purge system 21 and so on are executed, drive signals are outputted to the fuel injection valve 16, an ignition plug 52, the canister closure valve 26, the purge control valve 31 and so on via the input and output circuit 43 and when abnormality of the purge system 21 is detected, an alarm lamp 53 is turned on and the abnormality is informed to a driver.

Figure 2:
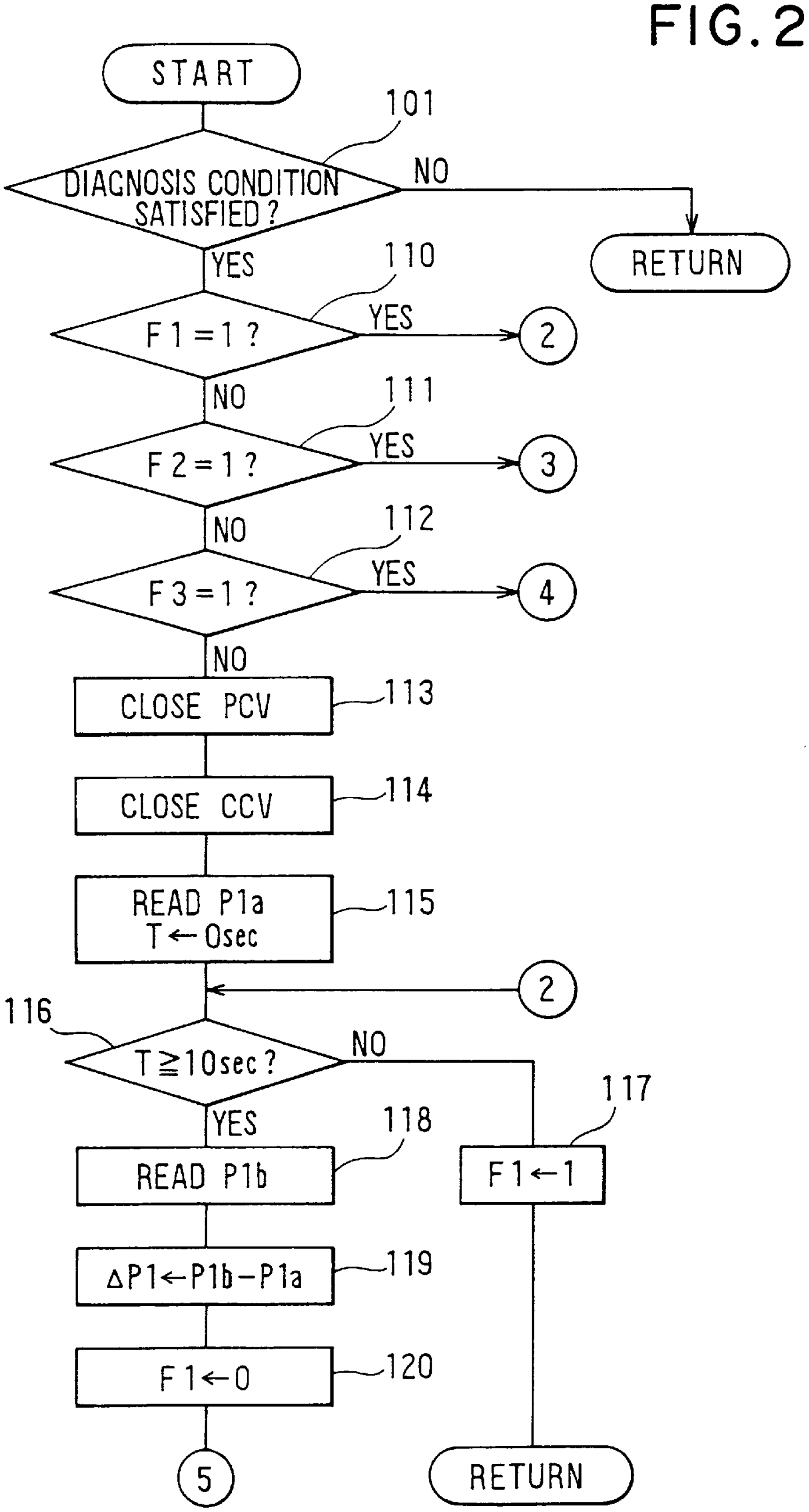
FIG. 2 is a part of a flowchart showing an abnormality diagnosis program according to the first embodiment of the present invention.

An explanation will be given for an abnormality diagnosis program of the purge system 21 executed by the control circuit 39 in reference to flowcharts of FIG. 2 through FIG. 4. The abnormality diagnosis program is repeatedly executed at every predetermined time period (for example, at every 256 ms) when an ignition switch (not illustrated) is turned on, and plays a role as leakage diagnosing means. When the program is started, firstly, in step 101 in FIG. 2, whether an abnormality diagnosis executing condition is satisfied is determined. In this case, the abnormality diagnosis executing condition is satisfied when an operating state of the engine is stabilized. Even in idling operation, when the operating state of the engine is stabilized, the abnormality diagnosis executing condition is satisfied.

When the abnormality diagnosis executing condition is not satisfied in step 101, the execution of the abnormality diagnosis is prohibited, and the program is finished without carrying out the following steps.

Meanwhile, when the abnormality diagnosis executing condition is satisfied instep 101, the operation proceeds to steps 110 through 112, and is branched to various steps while determining to what stage the current processing is progressed. The proceedings are four of a first through a fourth stage, and the processing stage can be determined by conditions of first through third flags F1 through F3. The first stage is determined when all of the flags F1 through F3 are set at "0", that is, when all of steps 110 through 112 are determined "No" and the operation proceeds to step 113.

Figures 5A, 5B, 5C:
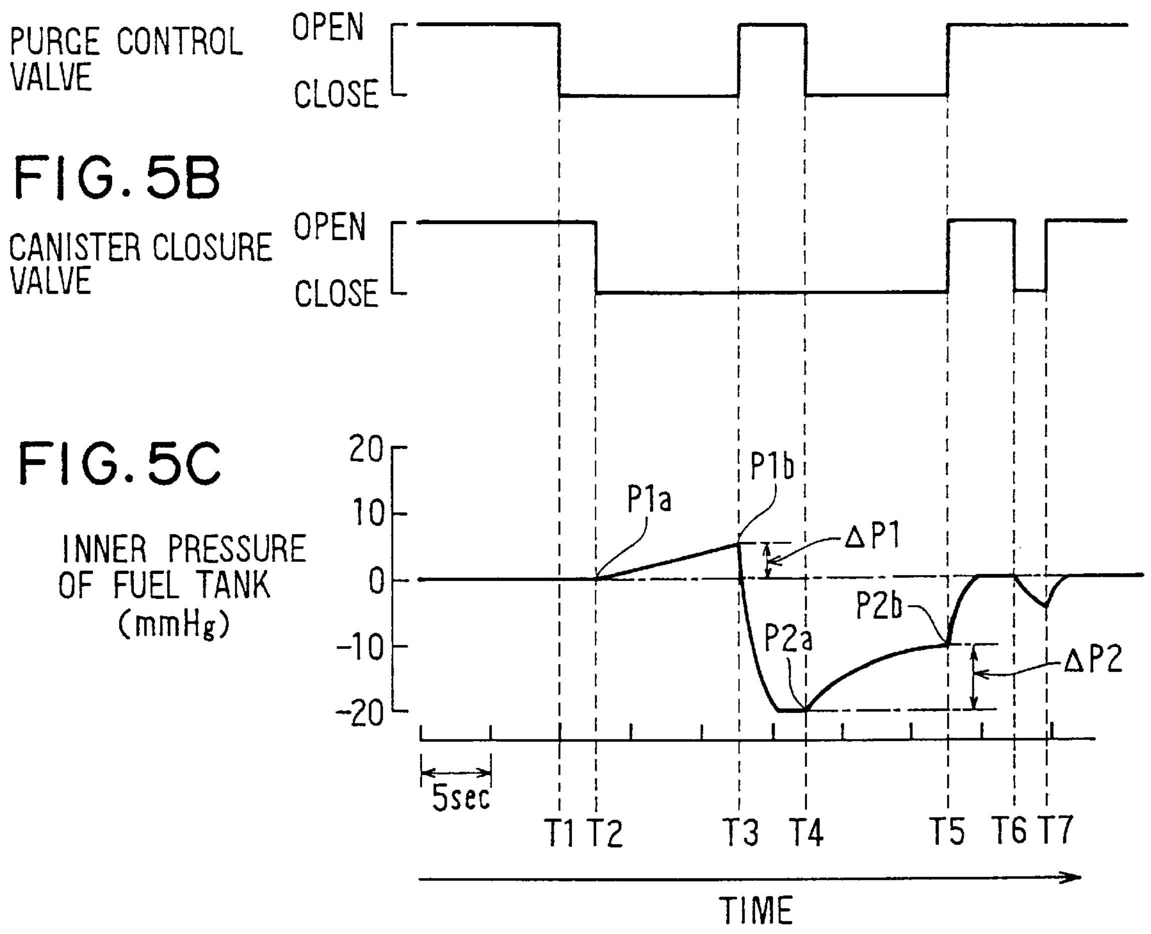
FIG. 5A is a time chart showing an operation of a purge control valve according to the first embodiment of the present invention.
FIG. 5B is a time chart showing an operation of a canister closure valve according to the first embodiment of the present invention.
FIG. 5C is a time chart showing a transition of an inner pressure of a fuel tank according to the first embodiment of the present invention.

At the first stage, firstly, the purge control valve 31 is fully closed in step 113. Thereafter, in step 114, the canister closure valve 26 is fully closed, and the purge system 21 between the fuel tank 17 and the intake pipe 12 is hermetically sealed. As shown in FIGS. 5A, 5B and 5C, the purge passage between the fuel tank 17 and the purge control valve 31 is maintained at an atmospheric pressure via the atmosphere communication pipe 25 by closing the purge control valve 31 while the canister closure valve 26 is opened. Hermetically sealed purge passage, the pressure of which is maintained at the atmospheric pressure, is formed by closing the canister closure valve 26 at T2 which is shortly after T1.

In step 115, an inner pressure P1*a* of the fuel tank is read at T2 in FIGS. 5A, 5B and 5C, and a timer T is reset and started. In step 116, it is determined whether a count value of the timer T is equal to or greater than 10 seconds or not. When the timer T is less than 10 seconds, the operation proceeds to step 117, the first flag F1 is set at "1" and the program is finished.

The following is an explanation for the second stage. According to the second stage, when F1 is determined to be "1" instep 110, the processing is repeated in the order of step 101→step 110→step 116→ . . . . During the second stage, a detected value of the pressure sensor 20 rises from 0 mmHg in accordance with a generated amount of the evaporated gas in the fuel tank 17 in a time period from T2 to T3 in FIGS. 5A, 5B and 5C.

When the timer T is equal to or greater than 10 seconds in step 116 (10 seconds have elapsed from T2), the operation proceeds to step 118. In step 118, the inner pressure P1*b* of the fuel tank is stored by reading an input signal from the pressure sensor 20. In step 119, a pressure change amount ΔPl during 10 seconds is calculated. Then, the first flag F1 is reset in step 120. Thereby, the processing at the second stage is finished and the operation proceeds to the third stage.

Figure 3:
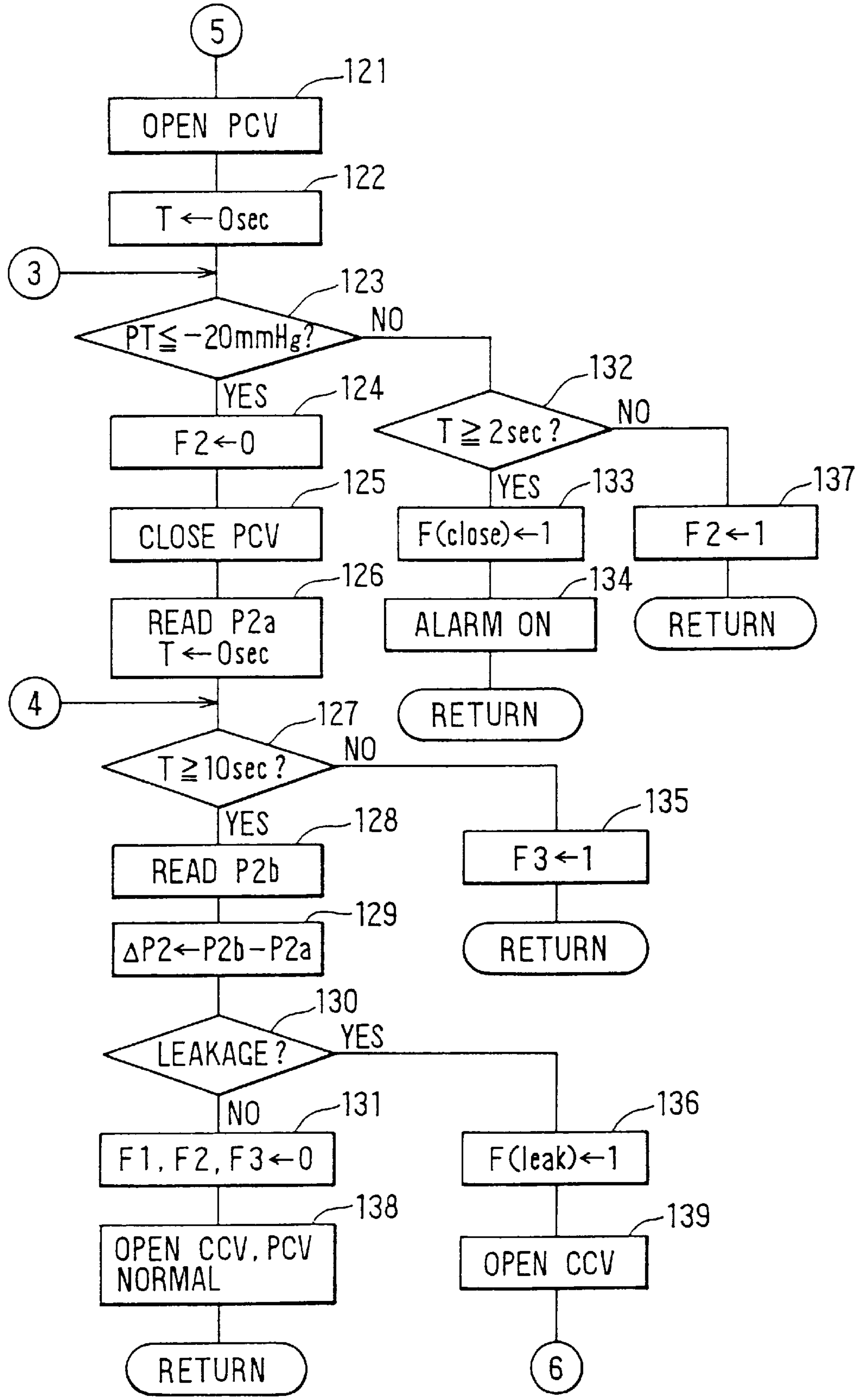
FIG. 3 is a part of the flowchart showing the abnormality diagnosis program according to the first embodiment of the present invention.
Figure 4:
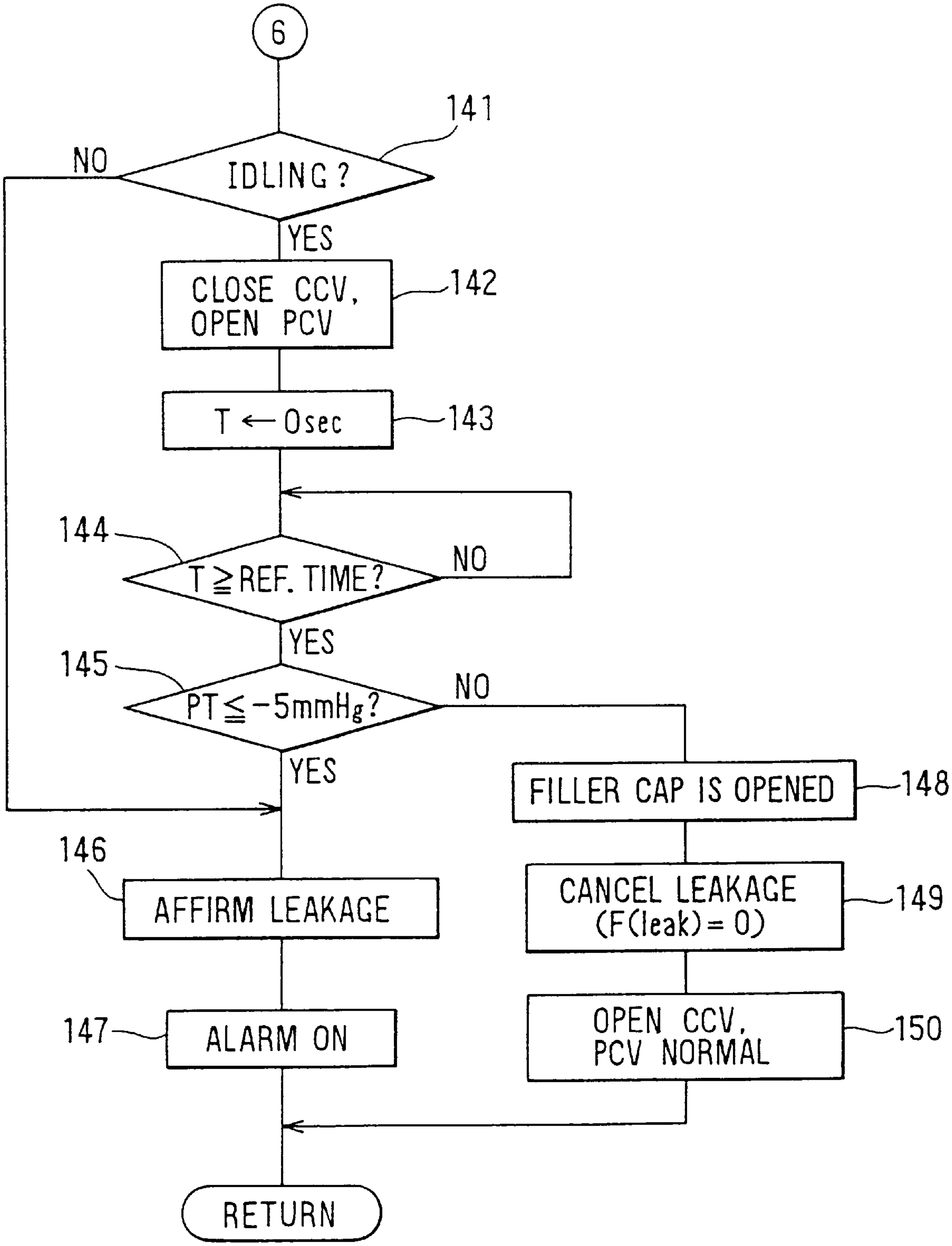
FIG. 4 is a part of the flowchart showing the abnormality diagnosis program according to the first embodiment of the present invention.

In the third stage, firstly, in step 121 in FIG. 3, the purge control valve 31 is switched from a fully closed state to a fully opened state and a control of introducing negative pressure from the intake pipe is started, and at the same time, the timer T is reset and started in step 122. In this case, by fully opening the purge control valve 31, negative pressure of the intake pipe is started to introduce into the prior purge system 21 which has been brought under the atmospheric pressure (at T3 in FIGS. 5A, 5B and 5C). Accordingly, the detected value of the pressure sensor 20 starts to fall when there is no abnormality caused by leakage or the like in the purge system 21.

In successive step 123, it is determined whether the inner pressure PT of the fuel tank is equal to or lower than, for example, −20 mmHg or not, based on the input signal from the pressure sensor 20. When PT is greater than −20 mmHg, the operation proceeds to step 132 to determine whether 2 seconds have elapsed after fully opening the purge control valve 31. When it is before elapse of 2 seconds, the operation proceeds to step 137, and the second flag F2 is set at "1", and the program is finished.

By setting the second flag F2 at "1", it is determined "No" in step 110 and is determined "Yes" in step 111 in executing the programs next time or later. Accordingly, the processing is repeated in the order of steps 101 through 111→step 123→ . . . . This condition is finished when it is determined "Yes" in step 123 or step 132. When it is determined "Yes" in step 132 first, it means a state in which negative pressure of the intake pipe cannot sufficiently be introduced into the purge system 21. Therefore, it is considered that somewhere in the purge system 21 is clogged. In this case, the operation proceeds to step 133, and a purge system clog flag F(close) is set at "1" which represents the clogging of the purge system 21. In successive step 134, the alarm lamp 53 is turned on to alarm abnormality of the purge system 21 to a driver, and the program is finished.

Meanwhile, when it is determined "Yes" in step 123 first, the operation proceeds to step 124, and the second flag F2 is reset. In successive step 125, the purge control valve 31 is fully closed again. Thereafter, the input signal from the pressure sensor 20 is read, and inner pressure P2*a* of the fuel tank, immediately after bringing the purge system 21 into a negative pressure hermetically sealed state, is stored and the timer T is reset and started in step 126. Accordingly, the operation proceeds from the third stage to the fourth stage.

By carrying out the above-described processes of steps 124 through 126, the purge system 21 is brought into a hermetically sealed state under negative pressure of −20 mmHg at T4 as shown in FIGS. 5A, 5B and 5C. Thereafter, the detected value of the pressure sensor 20 rises from −20 mmHg during a period from T4 to T5 in accordance with the generated amount of the evaporated gas in the fuel tank 17.

Instep 127, whether 10 seconds have elapsed after reading P2*a* is determined. When it is determined that 10 seconds have not elapsed in step 127, the operation proceeds to step 135 to set the third flag F3 at "1", and the program is finished. Thereby, in executing the program next time or later, it is determined "No" in steps 110 and 111, and is determined "Yes" in step 112, and the processing is repeated steps 101 through 112→step 127→ . . . .

Thereafter, when 10 seconds have elapsed after reading P2*a*, the operation proceeds to step 128 to read the input signal from the pressure sensor 20 and store the inner pressure P2*b* at T6. A pressure change amount ΔP2 (=P2*b*−P2*a*) during 10 seconds after the hermetical sealing is calculated in step 129. Thereafter, whether there is a leakage or not is determined based on a leakage determining condition shown by the following equation in step 130.

$$\Delta P2 > \alpha \cdot \Delta P1 + \beta \quad (1)$$

In this equation, reference α represents a coefficient for compensating a difference of the fuel evaporated amount caused by a pressure difference between the atmospheric pressure and the negative pressure. The reference β represents a coefficient for compensating a detection accuracy of the pressure sensor 20, leakage of the canister closure valve 26 and the like. When the above-described equation (1) is satisfied, "existence of leakage" is determined. That is, if a leakage is caused in the hermetically sealed section of the purge system 21 between the fuel tank 17 and the purge control valve 31, flowing out of gas from the hermetically sealed section to the atmosphere happens under positive pressure, and flowing in of air from the atmosphere into the hermetically sealed section happens under negative pressure. Under such circumstances, the pressure change amount ΔP2 under negative pressure is greater than the pressure change amount ΔP1 under atmospheric pressure. (ΔP2=(amount of generating evaporated gas from fuel tank 17)+(flow in amount from atmosphere to hermetically sealed section), and ΔP1=(amount of generating evaporated gas from fuel tank 17)−(flow out amount from hermetically sealed section to atmosphere.)) The leakage determining equation (1) is derived from this relationship.

When the leakage determining equation (1) is not satisfied, absence of leakage is determined, and the operation proceeds to step 131 to forcibly reset the respective first through third flags F1 through F3. Then, the operation proceeds to step 138 to close the canister closure valve 26 fully at T5 in FIGS. 5A, 5B and 5C, and to bring the purge control valve 31 into a normal control state, and the program is finished.

Meanwhile, when the leakage determining equation (1) is satisfied, it means that there is a hole, which causes the leakage, somewhere in the hermetically sealed section of the purge system 21 between the fuel tank 17 and the purge control valve 31. Therefore, an existence of the leakage is determined. In this case, the operation proceeds to step 136 to set a leakage flag F(leak) at "1" which represents the existence of the leakage. In step 139, the canister closure valve 26 is fully opened at T5 in FIGS. 5A, 5B and 5C to return the inside pressure of the purge system 21 to the atmospheric pressure. Then, leakage affirming processing in step 141 and thereafter shown in FIG. 4 is executed.

The leakage affirming processing is a processing for preventing erroneous diagnosis caused by opening the filler cap 38. Specifically, firstly, in step 141, whether the engine is in an idling state is determined by input signals from the idle switch 46 and the vehicle speed sensor 47. When the engine is not in the idling state (that is the case that the engine is running), it is determined that the filler cap 38 is not opened, and accordingly, the operation proceeds to step 146. In step 146, the diagnosis result of the existence of the leakage (leakage flag F(leak)=1) which has been carried out in the previous processing is affirmed. In step 147, the alarm lamp 53 is turned on to alarm the leakage of the purge system 21 to the driver, and the program is finished.

Meanwhile, when the engine is determined to be in an idling state in step 141, the operation proceeds to step 142. In step 142, the canister closure valve 26 is fully closed at T6 in FIGS. 5A, 5B and 5C to hermetically seal the purge system 21 between the fuel tank 17 and the intake pipe 12, and the purge control valve 31 is opened to start a pressure reintroducing operation for introducing negative pressure of the intake pipe into the purge system 21 under the atmospheric pressure. Then, the timer T is reset and started in step 143. At this moment, if the filler cap 38 is not opened, the inner pressure PT of the fuel tank starts to be decreased by the pressure reintroducing operation.

In step 144, whether a reference time period has elapsed from resetting and starting of the timer T is determined. If the reference time period is yet to elapse, the operation awaits elapse of the reference time. Then, as soon as the reference time elapses, the operation proceeds to step 145. In step 145, it is determined whether the inner pressure PT of the fuel tank is smaller than a predetermined pressure, such as −5 mmHg, based on the input signal from the pressure sensor 20. If it is greater than −5 mmHg, it is considered that negative pressure of the intake pipe is not sufficiently being introduced to the purge system 21. In this case, the operation proceeds to step 148 to determine that the filler cap 38 is opened. In step 149, the leakage flag F(leak) is reset to "0" which represents an absence of the leakage to cancel the diagnosis result of the existence of the leakage. Thereafter, the operation proceeds to step 150. In step 150, the canister closure valve 26 is fully opened at T7 in FIGS. 5A, 5B and 5C, and the purge control valve 31 is returned to the normal control state, and the program is finished.

Meanwhile, when the inner pressure PT of the fuel tank is determined that it is decreased to −5 mmHg or lower within the reference time period in step 145, it means a state that the negative pressure of the intake pipe can be sufficiently introduced into the purge system 21, and means a state that the filler cap 38 is closed. In this case, the operation proceeds to step 146 to affirm the diagnosis result of the existence of the leakage which has been carried out in the previous processing (leakage flag F(leak)=1). In step 147, the alarm lamp 53 is turned on to alarm the leakage of the purge system 21 to the driver, and the program is finished.

The reference time used in step 144 may be set by any one of the following methods (1) through (6).

(1) The reference time may be a predetermined constant time period (for example 5 seconds).

(2) Attention is paid to a point in which the degree of lowering the pressure in the purge system 21 in the pressure reintroducing operation is changed in accordance with a fuel remaining amount in the fuel tank 17 and a map of reference time with a parameter of a fuel remaining amount in the fuel tank 17 is previously set as shown by Table 1 described below, and the reference time may be calculated from the map of Table 1 in accordance with the fuel remaining amount.

TABLE 1

| | | | | | |
|---|---|---|---|---|---|
| Fuel remaining amount (liter) | 10 | 20 | 30 | 40 | 50 |
| Reference time (sec) | 10 | 9 | 8 | 7 | 6 |

Alternatively, the reference time may be calculated by the following equation:

$$\text{Reference time} = T1 \times A1/B1$$

where reference T1 represents basic time, reference A1 represents current fuel remaining amount, and reference B1 represents reference fuel remaining amount.

(3) Attention is paid to a point in which the degree of lowing the pressure in the purge system 21 in the pressure reintroducing operation is changed in accordance with a concentration of the evaporated gas in the fuel tank 17, a map of reference time with a parameter of a learned value of the concentration of the evaporated gas is previously set, and the reference time may be calculated from the map in accordance with the current learned value of the concentration of the evaporated gas. Alternatively, the reference time may be calculated by the following equation:

$$\text{Reference time} = T2 \times A2/B2$$

where reference T2 represents basic time, reference A2 represents current learned value of concentration of evaporated gas, and reference B2 represents reference concentration of evaporated gas.

(4) Attention is paid to a point in which the degree of lowering the pressure of the purge system 21 in the pressure reintroducing operation is changed in accordance with pressure (=atmospheric pressure) of the purge system 21 immediately before the pressure reintroducing operation, a map of the reference time with a parameter of the atmospheric pressure is previously set, and the reference time may be calculated from the map in accordance with the current atmospheric pressure. Alternatively, the reference time may be calculated by the following equation:

Reference time=T3×A3/B3 where reference T3 represents basic time, reference A3 represents current atmospheric pressure and notation B3 represents reference atmospheric pressure.

Furthermore, the pressure of the purge system 21 immediately before the pressure reintroducing operation, or the pressure of the purge system 21 before the abnormality diagnosis, may be used in place of the atmospheric pressure.

(5) Attention is paid to a point in which the degree of lowering of the pressure of the purge system 21 in the pressure reintroducing operation is changed in accordance with the pressure change amounts ΔP1 and ΔP2 of the purge system 21 in diagnosing leakage, and a map of the reference time with a parameter of ΔP1 or ΔP2 is previously set, and the reference time may be calculated from the map in accordance with current ΔP1 or ΔP2. Alternatively, the reference time may be calculated by the following equation:

Reference time=T4×A4/B4 where reference T4 represents basic time, reference A4 represents ΔP1 or ΔP2 in current leakage diagnosis, and reference B4 represents reference pressure change amount.

(6) Attention is paid to a point in which the degree of lowering the pressure of the purge system 21 in the pressure reintroducing operation is changed in accordance with a time period for introducing negative pressure of the purge system 21 in diagnosing leakage (time period by which pressure is lowered to −20 mmHg from when negative pressure is started to introduce), and a map of the reference time with a parameter of the negative pressure introducing time is previously set and, the reference time may be calculated from the map in accordance with the current negative pressure introducing time period. Alternatively, the reference time may be calculated by the following equation:

Reference time=T5×A5/B5 where reference T5 represents basic time, and reference A5 represents negative pressure introducing time period during the current leakage diagnosis, and reference B4 represents reference negative pressure introducing time period.

The reference time may be calculated by a map or an equation by combining two or more parameters among the fuel remaining amount, the learned value of concentration of evaporated gas, atmospheric pressure, the pressure change amounts ΔP1 and ΔP2 of the purge system 21 in diagnosing leakage, the negative pressure introducing time period in diagnosing leakage, pressure of the purge system 21 immediately before the pressure reintroducing operation, and pressure of the purge system 21 before diagnosing abnormality.

According to the first embodiment of the present invention, attention is paid to a point in which when the filler cap 38 of the fuel tank 17 is opened, the opening (fuel supply port 17*a*) is much larger than a hole causing leakage. When the engine is in an idling state (that is, a situation where the filler cap 38 is likely to be opened) when it is determined that there is a leakage in the purge system 21, the pressure reintroducing operation for introducing the negative pressure of the intake pipe into the purge system 21 is carried out again, and if the inner pressure of the purge system 21 is not decreased to the predetermined pressure (for example, −5 mmHg) within the reference time period, it is determined that the filler cap 38 is being opened, and a diagnosis result of the existence of the leakage is canceled. Accordingly, erroneous diagnosis caused by opening the filler cap 38 is prevented, and reliability of leakage diagnosis is improved. Furthermore, the determination of the degree of introducing pressure into the purge system 21 in the pressure reintroducing operation (that is, the determination of opening/closing of the filler cap 38) can be carried out by using the pressure sensor 20 which is used in the leakage diagnosis. Therefore, the need for a new sensor such as a fuel temperature sensor or the like is obviated, and requirements of reduction in a number of parts, reduction in a number of integration steps and reduction in cost are satisfied.

According to the above-described first embodiment, in determining the degree of introducing pressure into the purge system 21 in the pressure reintroducing operation, it is determined whether the inner pressure of the fuel tank is lowered to the predetermined pressure within the reference time period. Alternatively, it may be determined by one of a change rate of pressure, a change amount of pressure in a predetermined time period, and a time period required for changing pressure by a predetermined amount, during the pressure reintroducing operation.

Furthermore, although the negative pressure of the intake pipe is introduced into the purge system 21 in the abnormality diagnosis and the pressure reintroducing operation according to the first embodiment, positive pressure adjusted to constant pressure may be introduced into the purge system 21 in the abnormality diagnosis and/or the pressure reintroducing operation.

Second Embodiment

Figure 6:
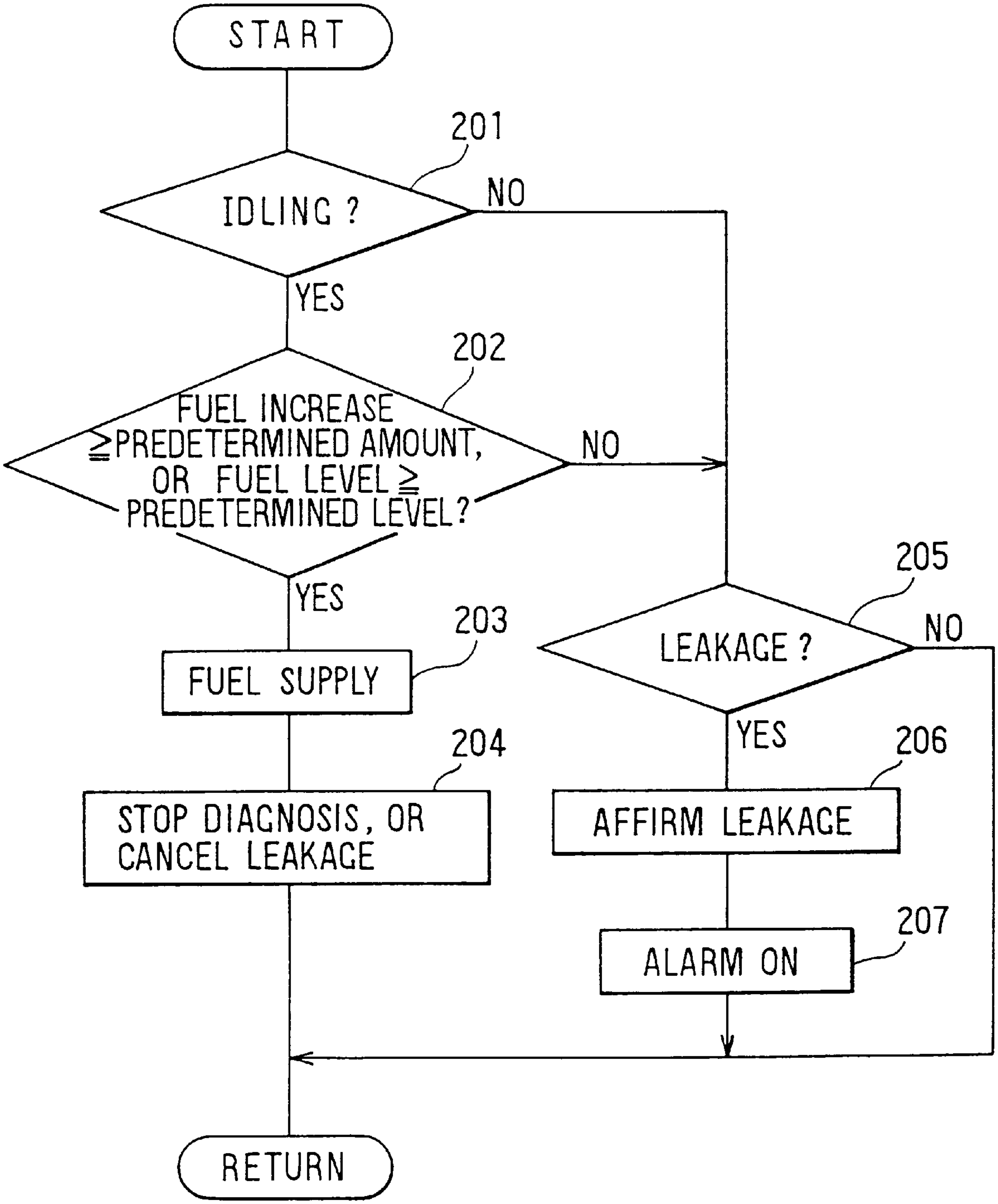
FIG. 6 is a flowchart showing a leakage diagnosis affirmation program according to a second embodiment of the present invention.

According to a second embodiment of the present invention, whether a fuel remaining amount in the fuel tank 17 is increased is determined during the idling operation. When the fuel remaining amount is increased, it is determined that fuel supply is being carried out, and the leakage diagnosis of the purge system 21 is interrupted (prohibited), or the diagnosis result of the existence of the leakage is canceled. The processing is executed by leakage diagnosis affirmation program shown in FIG. 6.

In this and the following embodiments, components which are substantially the same as those in previous embodiments are assigned the same reference numerals.

When an ignition switch (not illustrated) is turned on, the program is repeatedly executed at every predetermined time period and plays a role as leakage diagnosing means. When the program is started, whether the engine is in an idling state is determined by input signals from the idle switch 46 and the vehicle sensor 47 in step 201. When the engine is not in the idling state (that is, when vehicle is running), it is considered that fuel supply is not being carried out, and accordingly, the operation proceeds to step 205. In step 205, it is determined whether existence of leakage is diagnosed by leakage diagnosing processing as same as those in FIG. 2 and FIG. 3. when an absence of the leakage is diagnosed, the program is finished as it is. However, when an existence of the leakage is diagnosed, the operation proceeds to step 206 to affirm the diagnosis result of the existence of the leakage. Thereafter, the alarm lamp 53 is turned on in step 207, and the program is finished.

Meanwhile, when the engine is determined to be in the idling state in step 201, the operation proceeds to step 202.

In step 202, it is determined whether a fuel remaining amount is increased by a predetermined amount or more based on a detected value of fuel remaining amount detecting means such as a fuel gage of a float type or the like, or whether a fuel level in the fuel tank 17 reaches a predetermined level. The reason for the determination whether the fuel remaining amount is increased by the predetermined amount is to avoid to erroneously determine an apparent increase in the fuel remaining amount caused by an inclination or rocking of the vehicle as fuel supply operation. Furthermore, the reason for the determination whether the fuel level in the fuel tank 17 reaches the predetermined level is because when the fuel level reaches over the predetermined level, a space in the fuel tank 17 is reduced, and therefore, the inner pressure of the fuel tank detected by the pressure sensor 20 is liable to be influenced by the evaporated gas or influenced by inclination or rocking of a liquid level of fuel, and an accurate detection of the inner pressure of the fuel tank by the pressure sensor 20 becomes difficult.

When it is determined "Yes" in step 202, it is determined that fuel supply is being carried out in step 203. Then, the operation proceeds to step 204 to stop the leakage diagnosis of the purge system 21, or to cancel the current diagnosis result of the existence of the leakage, and the program is finished. Accordingly, erroneous diagnosis caused by fuel supply during the leakage diagnosis is surely prevented.

Furthermore, processing of steps 202 and its following steps may be carried out even while the vehicle is running by omitting the processing of step 201 of the program.

Furthermore, although the existence or absence of an increase in the fuel remaining amount (fuel supply is being carried out) is determined at every predetermined time period in the idling operation according to the second embodiment of the present invention, the existence or absence of an increase in the fuel remaining amount (fuel is being supplied) may be determined based on an amount of a change between the fuel remaining amount when the diagnosis is started and that when the diagnosis is finished (or after elapse of predetermined time period from when diagnosis is finished).

Third Embodiment

According to a third embodiment of the present invention, in the case of a vehicle having an automatic transmission, when a shift position of gear detected by shift position detecting means is located at a neutral position or a parking position, the leakage diagnosis of the purge system 21 is stopped, or cancel the current diagnosis result of the existence of the leakage. That is, when the shift position is disposed at a parking position, the vehicle is parking and at the neutral position, the vehicle may be stopping or parking. The opening of the filler cap 38 is carried out when the vehicle is parking or stopping, and therefore, in the case where the shift position is located at the neutral position or the parking position. Therefore, an erroneous diagnosis caused by opening the filler cap 38 is surely prevented if the leakage diagnosis of the purge system 21 is stopped, or the current diagnosis result of the existence of the leakage is canceled.

Figure 7:
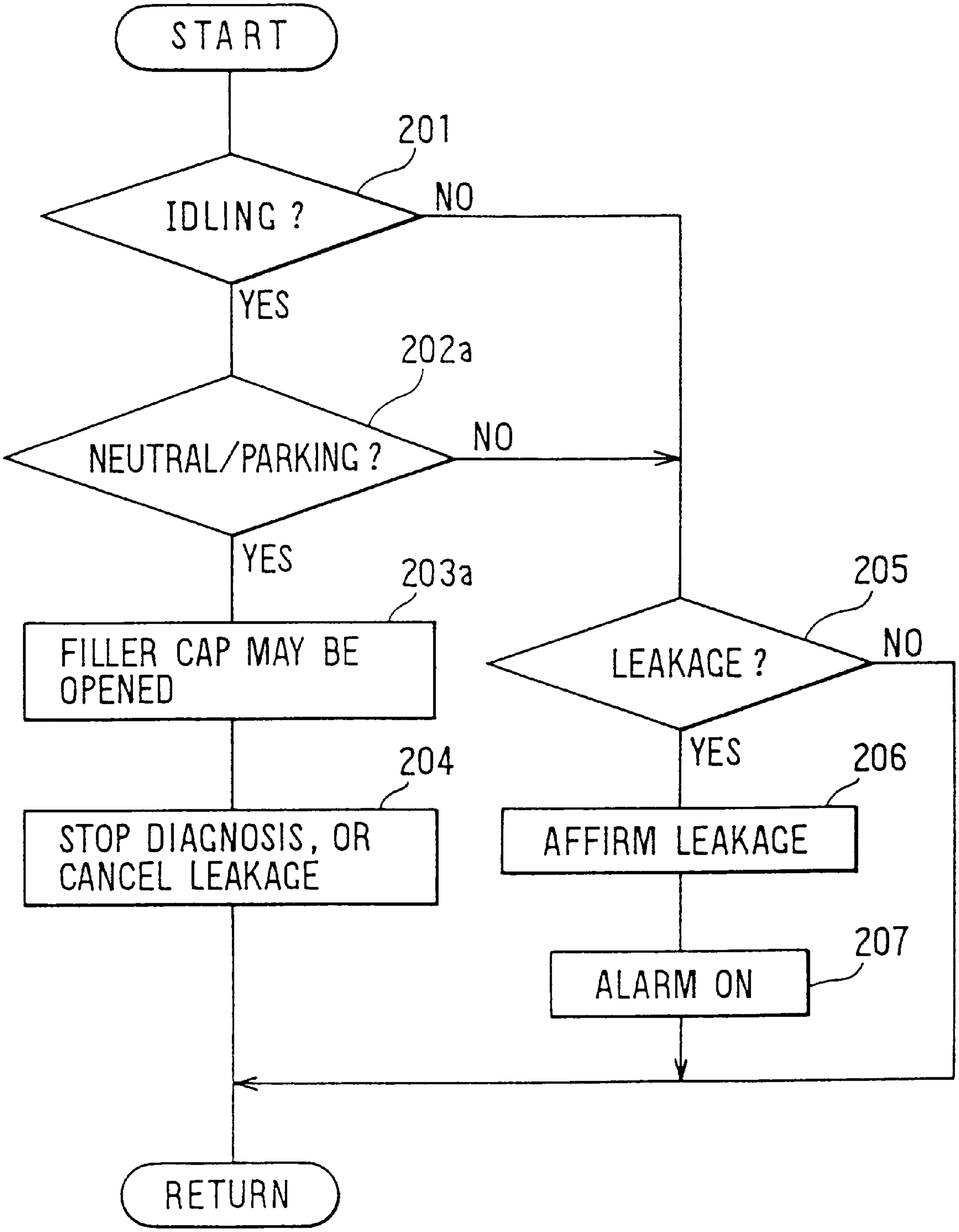
FIG. 7 is a flowchart showing a leakage diagnosis affirmation program according to a third embodiment of the present invention.

Such interruption, cancellation or affirmation of the leakage diagnosis based on the shift position are executed by a leakage diagnosis affirmation program shown in FIG. 7. The program in FIG. 7 is the same as the one shown in FIG. 6 except steps 202*a* and 203*a*. When an ignition switch (not illustrated) is turned on, the program is executed repeatedly at every predetermined time interval, and functions as leakage diagnosing means. When the program is started, whether the engine is in an idling state is determined in step 201. when the engine is in an idling state, the operation proceeds to step 202*a* to determine whether the shift position of the automatic transmission is located at a neutral position (N range) or a parking position (P range).

When it is determined that the shift position is located at the neutral position or the parking position instep 202*a*, the operation proceeds to step 203*a*. In 203*a*, it is determined there is a possibility that the filler cap 38 is opened. In step 204, the leakage diagnosis of the purge system 21 is stopped, or the current diagnosis result of the existence of the leakage is canceled, and the program is finished. Accordingly, erroneous diagnosis caused by opening the filler cap 38 is surely prevented.

Meanwhile, when it is determined in step 202*a* that the shift position is located at neither the neutral position nor the parking position, the operation proceeds to step 205. In step 205, whether the existence of the leakage has been diagnosed is determined. If the diagnosis result was that there was a leakage, the operation proceeds to step 206 to affirm the diagnosis result of the existence of the leakage. In step 207, the alarm lamp 53 is turned on, and the program is finished. Rest of the program are the same as those in the program of FIG. 6 in the second embodiment.

Further, processing of steps 202*a* and its following steps may be carried out even while the vehicle is running by omitting the processing of step 201 of the program.

Fourth Embodiment

An explanation will be given of a leakage determining program for the evaporated gas purge system 21 executed by the control circuit 39 according to a fourth embodiment of the present invention in reference to FIG. 8 through FIG. 11. When the program is started, it is determined whether a leakage determination completion flag F(check) is "1" representing a completion of the leakage determination in step 401. When F(check)=1 (completion of leakage determination), succeeding processes are not carried out, and the program is finished. The leakage determination completion flag F(check) is automatically initialized to "0", representing that the leakage determination has not been executed, when an ignition switch (not illustrated) is turned on, and thereafter, it is set to "1" when the leakage determination is executed.

Meanwhile, when F(check)=0 (nonexecution of leakage determination), the operation proceeds to step 402. In step 402, it is determined whether a leakage determination temporary flag F(close0) is "1". The leakage determination temporary flag F(close0) is a temporary flag in the case where it is determined that negative pressure cannot be introduced into the fuel tank 17 (there is large amount of leakage) when the leakage determination is executed while the vehicle is not running. Possible reasons for being unable to introduce negative pressure into the fuel tank 17 are that the fuel cap 38 is detached from the fuel supply port 17*a* of the fuel tank 17 during fuel supply operation, or there is a large amount of real leakage. It is stored in the leakage determination temporary flag F(close0) whether a further leakage determination is necessary while the vehicle is running.

Figure 10:
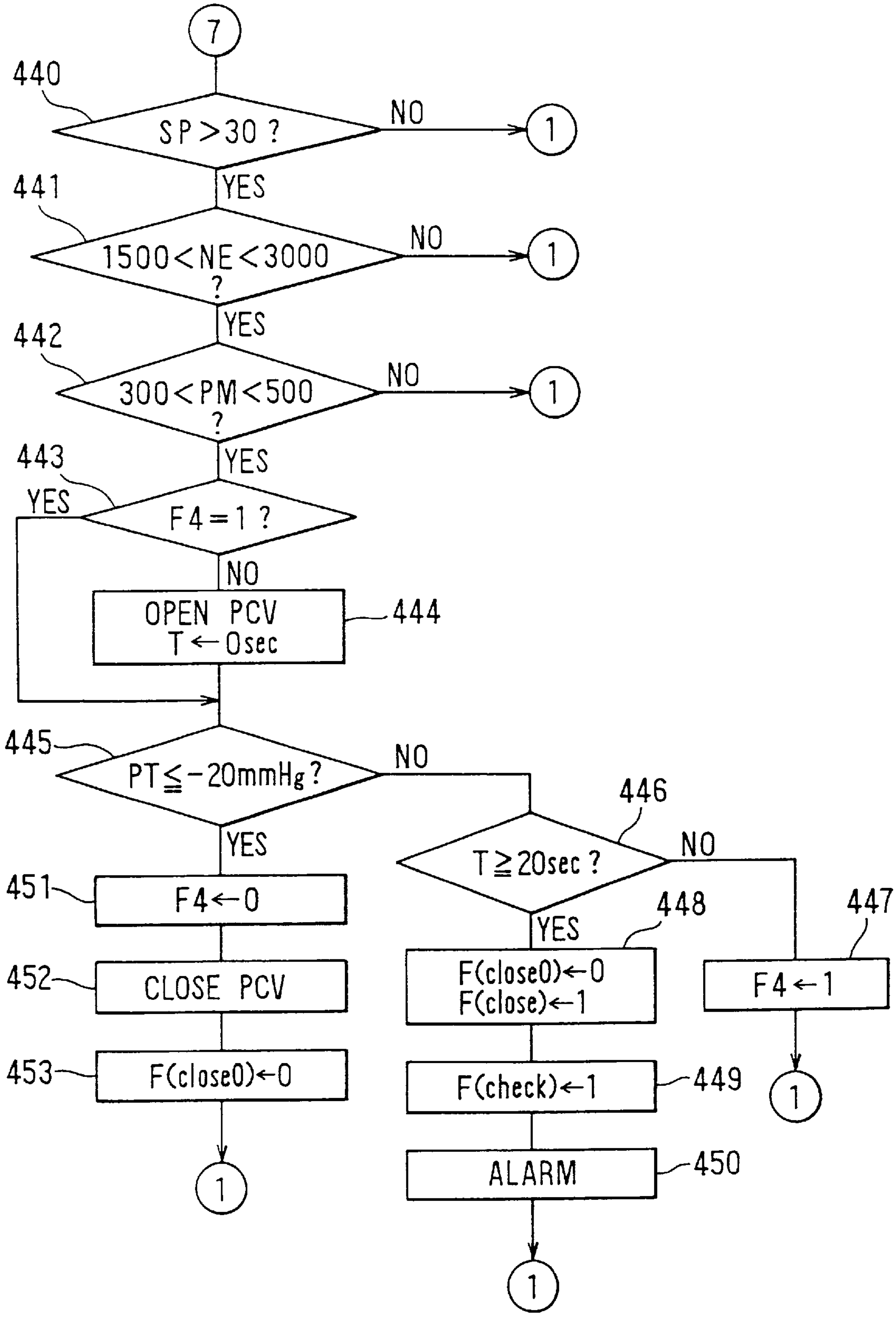
FIG. 10 is a part of the flowchart showing the leakage determining program according to the fourth embodiment of the present invention.

When it is determined that a further leakage determination is necessary since leakage determination temporary flag F(close0)=1 (negative pressure cannot be introduced) in step 402, the operation proceeds to step 440 in FIG. 10. When F(close0)=0 (negative pressure can be introduced), in order to execute the leakage determination while the vehicle is stopped, processes in step 403 and the following steps are executed as follows. First, it is determined in steps 403 and 404 whether leakage determination executing conditions described in A and B below are satisfied.

A. Vehicle speed SP detected by the vehicle speed sensor 47 is "0", that is, the vehicle is stopped (step 403).

B. The idle switch 46 is turned on, that is, the engine is idling (step 404).

When both of the conditions of A and B are satisfied, the leakage determination executing conditions are met. However, if one of the conditions A and B is not satisfied, that is, SP≠0 (vehicle is running), or engine is not idling, the leakage determination executing conditions are not met, and the program is finished without executing the following steps.

Meanwhile, when the leakage determination executing conditions are met, that is, SP=0 (vehicle is stopped) and the engine is idling, the operation proceeds to steps 405 through 407 to determine the location of the current process, and the operation is branched to various stages accordingly. Such stages consists of a first through fourth stages. Each of the stages can be determined from respective conditions of the first through third flags F1, F2 and F3. When all of the flags F1, F2 and F3 are set to "0", that is, the determination in steps 405 through 408 are all "No", the operation proceeds to step 408 to execute the first stage.

Figures 11A, 11B, 11C:
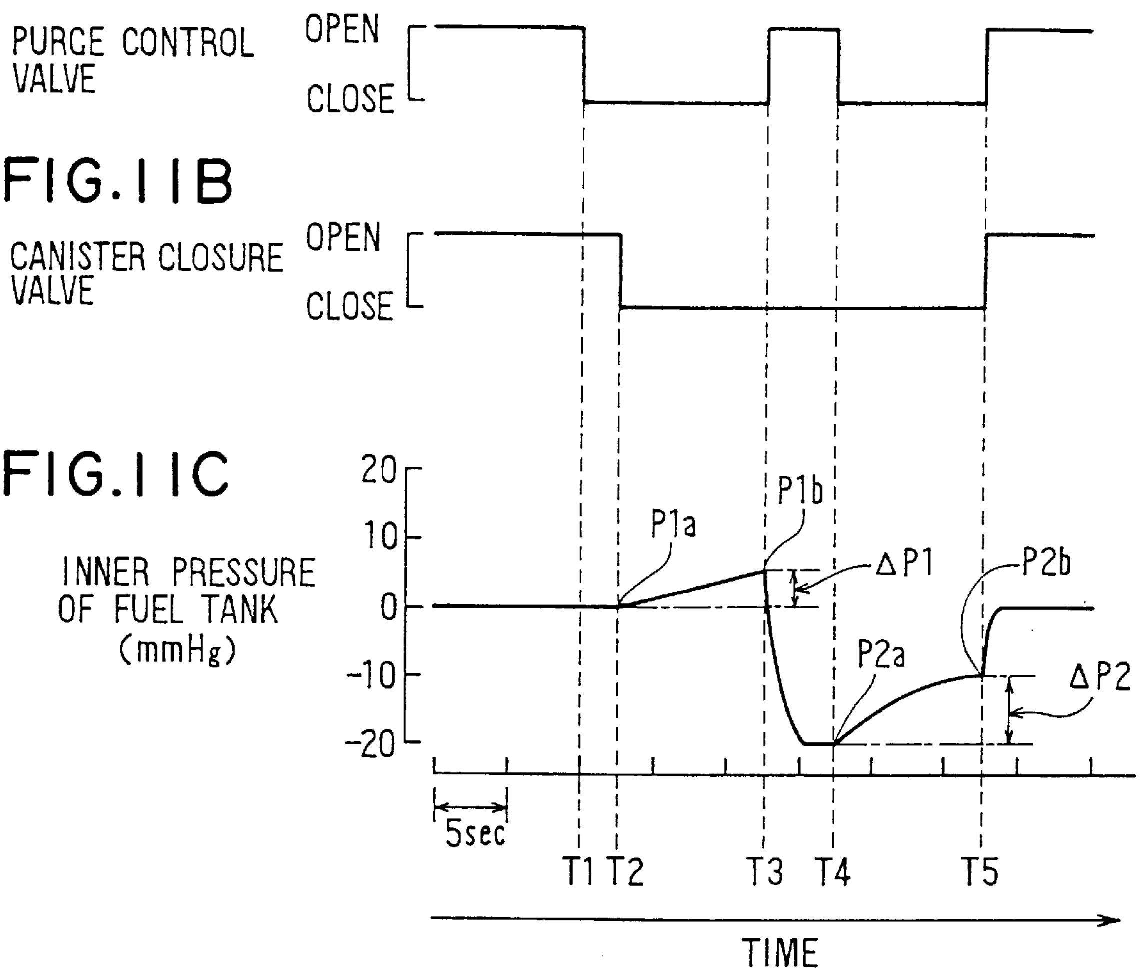
FIG. 11A is a time chart showing an operation of a purge control valve according to the fourth embodiment of the present invention.
FIG. 11B is a time chart showing an operation of a canister closure valve according to the fourth embodiment of the present invention.
FIG. 11C is a time chart showing a transition of an inner pressure of a fuel tank according to the fourth embodiment of the present invention.

At the first stage, the purge control valve 31 is fully closed in step 408. Then, the canister closure valve 26 is fully closed in step 409 to seal the purge passage between the fuel tank 17 and the intake pipe 12 hermetically. That is, as shown in FIGS. 11A, 11B and 11C, the purge control valve 31 is fully closed at T1 when the canister closure valve 26 is opened. Accordingly, the purge passage from the fuel tank 17 to the purge control valve 31 maintains the atmospheric pressure via the atmosphere communication pipe 25. By fully closing the canister closure valve 26 at T2 which is slightly retarded from T1, a hermetically closed purge passage which is maintained at atmospheric pressure is formed.

In step 410, inner pressure P1*a* of the fuel tank at T2 of FIG. 11C is read, and the timer T is reset and started. In step 411, it is determined whether the count value of the timer T is equal to or greater than 10 seconds or not. When it is before elapsing 10 seconds, the operation proceeds to step 412 to the first flag F1 at "1", and the program is finished.

Thereafter, the operation proceeds to the second stage. In the second stage, it is determined "Yes" in step 405, and processes are repeated in order of steps 401 through 405→step 411→ . . . . During this procedure, the detected value of the pressure sensor 20 for the pressure in the fuel tank 17 rises from 0 mmHg in accordance with generated amount of the evaporated gas in the fuel tank 17 between T2 and T3 in FIG. 11C.

Figure 9:
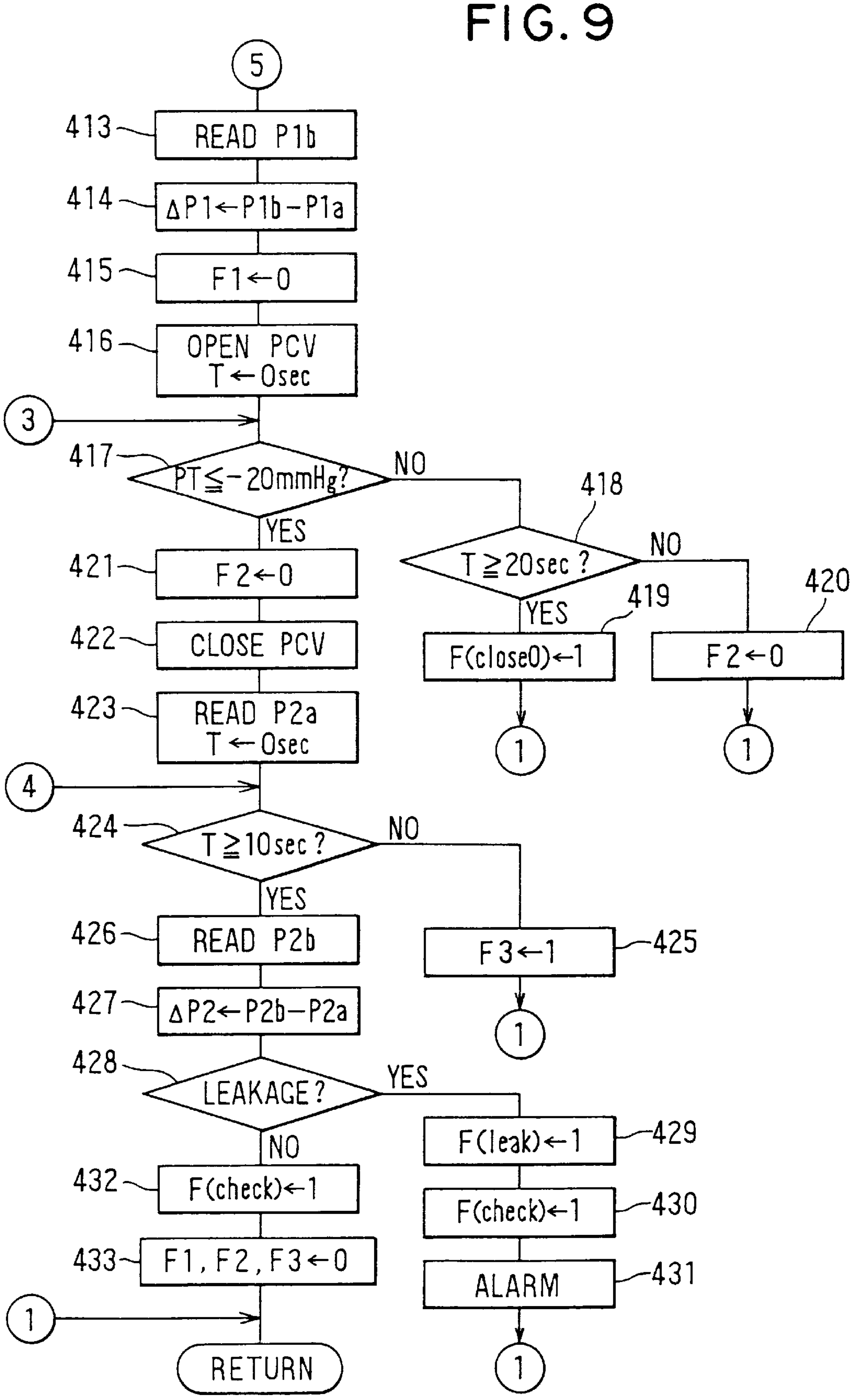
FIG. 9 is a part of the flowchart showing the leakage determining program according to the fourth embodiment of the present invention.

When 10 seconds have elapsed from T2 (T2 is a timing when P1*a* is detected), the operation proceeds to step 413 in FIG. 9. The inner pressure P1*b* of the fuel tank detected by the pressure sensor 20 is read in step 413. In step 414, a pressure change amount ΔP1 (P1*b*–P1*a*) for 10 seconds is calculated. Thereafter, the first flag F1 is reset instep 415. Then, the second stage is finished, and the operation proceeds to the third stage.

In the third stage, firstly, the purge control valve 31 is switched from fully closed state to fully opened state to start the control of introducing negative pressure in step 416, and the timer T is reset and started simultaneously. Since the purge control valve 31 is fully opened, negative pressure of the intake pipe starts to be introduced into the hermetically seal purge passage which has been under the atmospheric pressure (T3 in FIGS. 11A, 11B and 11C). Accordingly, the detected value of the pressure sensor 20 starts to decrease unless there is no leakage in the purge passage.

In step 417, it is determined whether inner pressure PT of the fuel tank becomes equal to or lower than a determined negative pressure (for example, –20 mmHg) based on an input signal from the pressure sensor 20. When PT>–20 mmHg, the operation proceeds to step 418 to determine whether a predetermined time period (for example, 20 seconds) has elapsed after starting to introduce the negative pressure by fully opening the purge control valve 31. When it is before elapsing 20 seconds, the operation proceeds to step 420. In step 420, the second flag F2 is set at "1" representing that the leakage determination is during its execution, and the program is finished.

By setting the second flag F2 as "1" in this way in step 420, the determinations become "No" in step 405, "Yes" in step 406, and processes are repeated in order of steps 401 through 406→step 417→ . . . .

When the determination becomes "Yes" in step 418 prior to the determination of step 417, that is, when the inner pressure PT of the fuel tank is not lowered to the predetermined negative pressure (for example, –20 mmHg) even when the predetermined time period (for example, 20 seconds) has elapsed after starting to introduce the negative pressure, it means that the negative pressure cannot be introduced into the fuel tank 17. Possible causes for being unable to introduce the negative pressure into the fuel tank 17 are clogging of the purge passage, opening of the fuel supply port 17*a* of the fuel tank 17 by fuel supply operation, and a large amount of real leakage in the purge passage between the fuel tank 17 and the intake pipe 12 (for example, when a large hole or crack is caused in the purge passage, or the piping system is detached). In such case, the operation proceeds to step 419 to carry out the leakage determination again while the vehicle is running. Therefore, the leakage determination temporary flag F(close0) is set as "1" in step 419, and the program is finished.

Meanwhile, when the determination is "Yes" in step 417 prior to the determination in step 418, that is, when the negative pressure can be introduced into the fuel tank 17, the operation proceeds to step 421. The second flag F2 is set as "0" in step 421. In step 422, the purge control valve 31 is fully closed again. In step 423, an input signal from the pressure sensor 20 is read, and inner pressure P2*a* of the fuel tank, immediately after the purge passage has been brought into a hermetically sealed state under negative pressure, is stored, and the time T is reset and started. Thereby, the operation proceeds from the third stage to the fourth stage.

By executing the steps 421 through 423, the inside of the hermetically sealed purge passage is brought into a state where it is adjusted to a negative pressure of –20 mmHg at T4, as shown in FIG. 11C. Thereafter, the detected value of the pressure sensor 20 rises from –20 mmHg in accordance with a generated amount of the evaporated gas in the fuel tank 17 between T4 and T5.

In step 424, it is determined whether 10 seconds have elapsed after reading the inner pressure P2*a* of the fuel tank. When it is before elapsing 10 seconds, the operation proceeds to step 425 to set the third flag F3 as "1", and the program is finished. Thereby, in the execution of subsequent programs, it is determined "No" in steps 405 and 406, and "Yes" in step 407, and processes are repeated in order of steps 401 through 407→step 424→ . . . .

Thereafter, if it is determined in step 424 that 10 seconds have elapsed after reading the inner pressure P2*a* of the fuel tank, the operation proceeds to step 426 to read an input signal from the pressure sensor 20, and store the inner pressure P2*b* of the fuel tank. Then, the pressure change amount ΔP2 (=P2*b*−P2*a*) for 10 seconds after the hermetically sealing operation is calculated in step 427. Thereafter, the determination whether existence or absence of leakage is made based on a leakage determining condition shown by the following equation H in step 428.

$$H{:}\Delta P2>\alpha\cdot\Delta P1+\beta$$

where reference α represents a coefficient for correcting a difference of a fuel evaporated amount caused by a difference between the atmospheric pressure and the negative pressure, and reference β represents a coefficient for correcting detection accuracy of the pressure sensor 20, pressure leakage of the canister closure valve 26 and the like. When the above equation is satisfied, it is determined that "existence of leakage (there is a leakage)" in step 428. That is, if cause of leakage exists in the hermetically sealed section between the fuel tank 17 and the purge control valve 31, flowing out of the air from the hermetically sealed section to the atmosphere occurs under positive pressure, and in the meantime, flowing in of the air from the atmosphere to the hermetically sealed section occurs under the negative pressure. Accordingly, pressure change amount ΔP2 under negative pressure is greater than pressure change amount ΔP1 under atmospheric pressure, where "ΔP2=(generated amount of evaporated gas from fuel tank 17)+(amount of flow in from atmosphere to hermetically sealed section)", and "ΔP1=(generated amount of evaporated gas from fuel tank 17)−(amount of flow out from hermetically sealed section to atmosphere)". The leakage determining condition shown in the above equation H is derived from this relationship.

When the leakage determining condition of the above equation is satisfied, that is, when "existence of leakage" is determined in step 428, it means that there is a portion causing leakage somewhere in the purge passage between the fuel tank 17 and the intake pipe 17. In step 429, a purge passage leakage flag F(leak) is set as "1". In step 430, the leakage determination completion flag F(check) is set as "1" representing a completion of the leakage determination, and the alarm lamp 53 is turned on in step 431, and the program is finished.

In contrast thereto, when it is determined "No" in step 428, that is, if there is no leakage, the operation proceeds to step 432. In step 432, the leakage determination completion flag F(check) is set as "1" representing a completion of the leakage determination. In step 433, each of the first through third flags F1, F2 and F3 is forcibly set as "0", and the program is finished.

Figure 8:
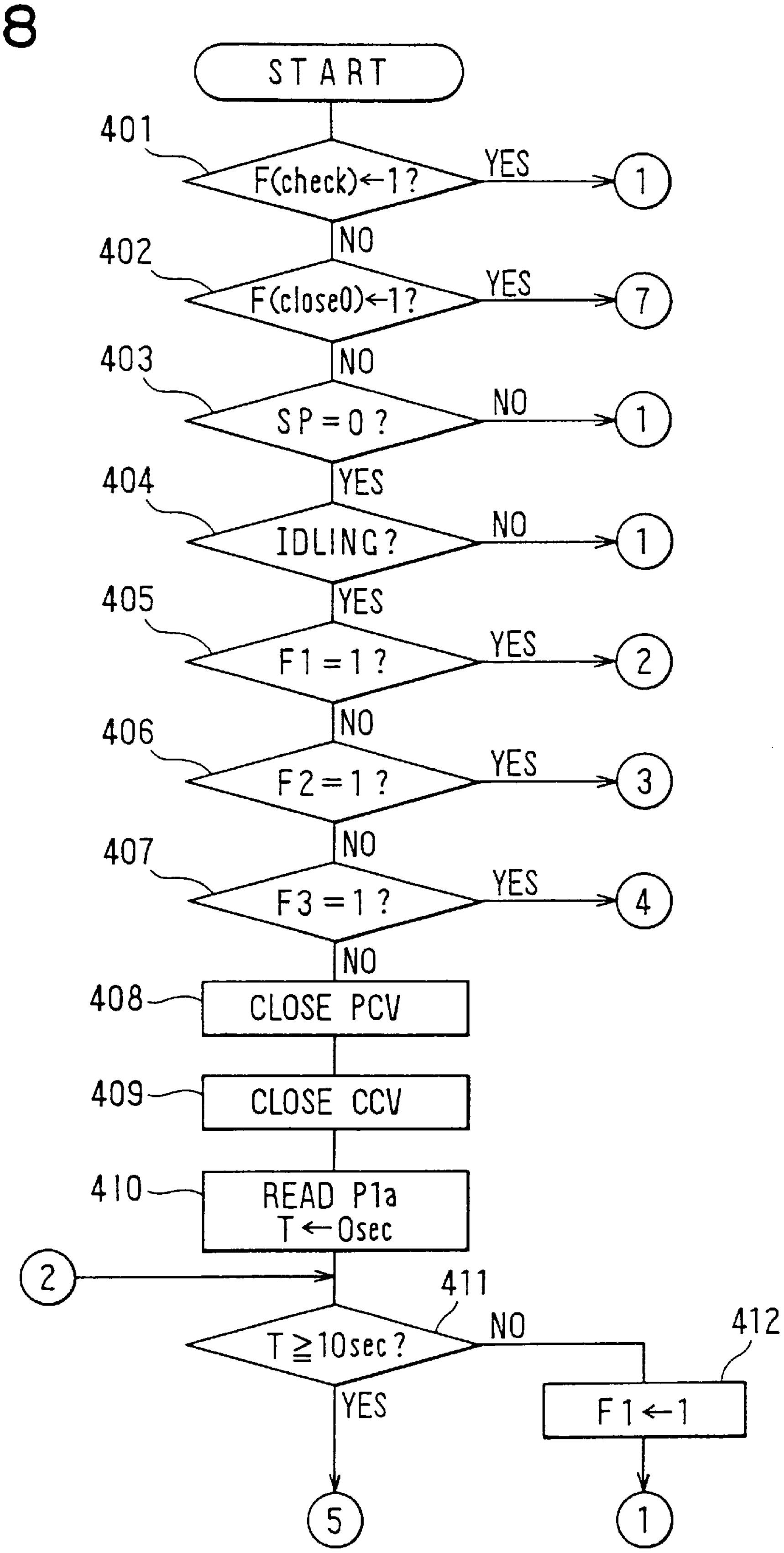
FIG. 8 is a part of a flowchart showing a leakage determining program according to a fourth embodiment of the present invention.

Meanwhile, when it is determined that the negative pressure cannot be introduced into the fuel tank 17 while the vehicle is not runnig (when where is a large leakage) in steps 417, 418 and 419 mentioned above, and the leakage determination temporary flag F(close0) is set as "1", in other words, when it is determined that a further leakage determination, while the vehicle is runnig, is necessary, it is determined "Yes" in step 402 in FIG. 8, and the operation proceeds to step 440 and its subsequent steps in FIG. 10 to execute leakage determination as follows while the vehicle is running. First, it is determined whether leakage determination executing conditions described in the following E through G are satisfied in steps 440 through 442.

E. The vehicle speed SP is greater than a predetermined speed, for example, 30 km/h (step 440).

F. The engine speed NE falls in a predetermined range, for example, 1,500 rpm<NE<3,000 rpm (step 441).

G. The intake pipe pressure PM falls in a predetermined range, for example, 300 mmHg<PM<500 mmHg (step 442).

When all of the conditions of E through G are all satisfied, in other words, when the driving condition is stabilized, the leakage determination executing conditions in running vehicle are established. However, when any one of those conditions is not satisfied, the leakage determination executing conditions in running vehicle are not established, and the program is finished without executing its subsequent steps.

Meanwhile, when the leakage determination executing conditions in running vehicle are established, the operation proceeds to step 443 to determine whether a fourth flag F4 is "1" which represents that leakage determination in running a vehicle is under execution. When F4=0 (leakage determination is not under execution) in step 443, the operation proceeds to step 444. In step 444, the control of introducing negative pressure is started by switching the purge control valve 31 from a fully closed state to a fully opened state, and at the same time, the timer T is reset and started, and the operation proceeds to step 445. Meanwhile, when F4=1 (leakage determination is under execution) in step 443, the operation proceeds to step 445 without carrying out the processing in step 444.

In step 445, it is determined whether the inner pressure PT of the fuel tank is not greater than a predetermined negative pressure (for example, −20 mmHg) based on the input signal from the pressure sensor 20. When PT>−20 mmHg, the operation proceeds to step 446 to determine whether a predetermined time period (for example, 20 seconds) have elapsed after starting introduction of negative pressure by fully opening the purge control valve 31. When it is before elapsing 20 seconds, the operation proceeds to step 447 to set the fourth flag F4 as "1" which represents that the leakage determination is under execution, and the program is finished.

In executing this program in the subsequent determinations, if it is determined "Yes" in step 446 prior to the determination in step 445, that is, when the inner pressure PT of the fuel tank is not lowered to the predetermined negative pressure (for example, −20 mmHg) even after elapsing the predetermined time period (for example, 20 seconds) from start of introducing the negative pressure, it means that the negative pressure cannot be introduced into the fuel tank 17 while the vehicle is running. Even if the leakage determination is carried out when the negative pressure cannot be introduced into the fuel tank 17 since the fuel supply port 17*a* of the fuel tank 17 is opened by fuel supplying operation or the like while the vehicle is not running, after fuel supply has been finished, the fuel supply port 17*a* of the fuel tank 17 is closed by the fuel cap 38. Therefore, under such circumstances, it is unable to introduce the negative pressure into the fuel tank 17 while the vehicle is running only when a large amount of leakage really exists in the purge passage between the fuel tank 17 and the intake pipe 12 (for example, a case in which a large hole or crack is caused in the purge passage, or the piping system is detached) and when the purge passage is clogged. In that case, it is not necessary to consider about the possible opening of the fuel supply port 17*a* of the fuel tank 17.

Therefore, when the negative pressure cannot be introduced into the fuel tank 17 while the vehicle is running, it is finally determined that a leakage exists, and the operation proceeds to step 448. In step 448, the leakage determination temporary flag F(close0) is reset as "0", and the leakage determination flag F(close) is set as "1" which represents an existence of a large amount of leakage. In succeeding step 449, the leakage determination completion flag F(check) is set as "1" which represents the completion of the leakage determination. The alarm lamp 53 is turned on in step 450 to inform the abnormality, and the program is finished.

Meanwhile, when it is determined "Yes" in step 445 prior to the determination in step 446, in other words, when the negative pressure can be introduced into the fuel tank 17, the determination of being unable to introduce the negative pressure, which is carried out while the vehicle is stopped, is considered to be caused by opening the fuel supply port 17*a* of the fuel tank 17, and the leakage determination is carried out again while the vehicle is stopped. In this case, the operation proceeds to step 451 to set the fourth flag F4 as "0". In step 452, the purge control valve 31 is again fully closed to finish the leakage determination while the vehicle is running. In step 453, the leakage determination temporary flag F(close0) is reset as "0", and the program is finished.

According to the leakage determining program of the fourth embodiment, when the negative pressure cannot be introduced into the fuel tank 17 (that is, when it is determined that there is a large amount of leakage) after the leakage determination when the engine is idling and the vehicle is stopped, the leakage determination to introduce the negative pressure into the fuel tank 17 is carried out again while the vehicle is running. Therefore, even if it is determined that there is a large amount of leakage after the execution of the leakage determination when the vehicle is not running and the fuel supply port 17*a* of the fuel tank 17 is opened, it is possible to confirm whether there is a real leakage because the second leakage determination is carried out while the vehicle is running after closing the fuel supply port 17*a*. Accordingly, an erroneous leakage determination is prevented, and the reliability of leakage determination is improved.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A leakage diagnosing apparatus for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said apparatus comprising:

leakage diagnosing means for diagnosing existence of leakage in the purge system by detecting at least one of: (a) pressure in a part of the purge system at least including the fuel tank and the canister if said part of the purge system is hermetically sealed with said cap after introducing air therein, and (b) pressure change in said part of the purge system if it is hermetically sealed with said cap after introducing air therein;

means for reintroducing air into said part of the purge system when it is tentatively determined that leakage exists during idling of the engine; and means for canceling said earlier tentative determination of leakage existence if it is determined that said cap likely was not sealed with the tank during the earlier diagnosis.

2. A leakage diagnosing apparatus for an evaporated gas purge system as in claim 1 wherein:

said means for canceling a prior tentative determination of leakage effects said cancellation when pressure in said part of the purge system after reintroduction of air does not reach a predetermined pressure within a predetermined time period.

3. A leakage diagnosing apparatus for an evaporated gas purge system as in claim 2 further comprising:

means for determining said predetermined time period based on at least one of: (a) atmospheric pressure, (b) a learned value of concentration of evaporated gas, (c) fuel remaining in the fuel tank, (d) pressure of said part of the purge system before said reintroduction of air, and (e) pressure change in said part of the purge system during leakage diagnosis.

4. A leakage diagnosing apparatus for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said apparatus comprising:

leakage diagnosing means for diagnosing existence of leakage in the purge system based on detecting at least one of: (a) pressure in a part of the purge system at least including the fuel tank and the canister it said part of the purge system is hermetically sealed with said cap after introducing air therein, and (b) pressure change in said part of the purge system if it is hermetically sealed with said cap after introducing air therein;

fuel detecting means for detecting fuel remaining in said fuel tank;

means for determining whether said detected fuel remaining is increased; and means for executing one of: (a) stopping said leakage diagnosis and (b) canceling a current diagnosis of leakage existence, when it is determined that said cap likely was not sealed with the tank during said leak diagnosis because said detected fuel remaining amount is increased.

5. A leakage diagnosing apparatus for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said apparatus comprising:

leakage diagnosing means for diagnosing existence of leakage in the purge system based on detecting at least one of: (a) pressure in a part of the purge system at least including the fuel tank and the canister if said part of the purge system is hermetically sealed with said cap after introducing an air therein, and (b) pressure change in said part of the purge system if it is hermetically sealed with said cap after introducing air therein:

shift position detecting means for detecting a gear shift position of an automatic transmission;

means for determining whether said detected shift position is one of a neutral position and a parking position; and means for executing one of: (a) stopping said leakage diagnosis and (b) canceling a current diagnosis of leakage existence, when said detected shift position is one of said neutral position and said parking position.

6. A leakage diagnosing apparatus for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said apparatus comprising:

leakage diagnosing means for determining existence of leakage in the purge system based on detecting at least one of: (a) pressure in the purge system if the purge system is hermetically sealed with said cap after introducing one of a positive pressure and a negative pressure therein, and (b) pressure change in the purge system if the purge system is hermetically sealed with said cap after introducing one of a positive pressure and a negative pressure therein; and means for operating said leakage diagnosing means again while a vehicle is running, if it determines that leakage exists in the purge system while said vehicle is stopped.

7. A leakage diagnosing apparatus for an evaporated gas purge system as in claim 6, wherein:

said leakage diagnosing means attempts to introduce negative pressure into the purge system again while an associated vehicle is running if said negative pressure was unable to be introduced into the purge system while said vehicle was stopped.

8. A leakage diagnosing apparatus for an evaporated gas purge system as in claim 7 wherein:

said leakage diagnosing means attempts to introduce negative pressure into the fuel tank again while a vehicle is running if negative pressure was unable to be introduced into the fuel tank while said vehicle was stopped.

9. A leakage diagnosing method for an evaporated gas purge system having a fuel tank with a removable cap, an intake pipe for an engine, a passage which connects the fuel tank to the intake pipe; a canister installed in the passage for adsorbing evaporated gas, and a purge control valve installed in the passage for controlling a purge of said adsorbed evaporated gas from the canister to the intake pipe, said method comprising:

tentatively diagnosing existence of leakage in the purge system by detecting pressure or pressure change in at least a part of the purge system if it is hermetically sealed and air has been introduced therein;

reintroducing air into said part of the purge system when it is determined that leakage exists during an engine idling state; and canceling the initial tentative determination of leakage existence after said reintroduction of air if it is determined that said cap likely was not sealed with the tank during the earlier diagnosis.

10. A leakage diagnosing method as in claim 9 wherein:

said canceling of a prior tentative determination of leakage occurs when a predetermined pressure is not reached within a predetermined time period during said reintroduction of air.

11. A leakage diagnosing method as in claim 10, wherein:

determining said predetermined time period is based on at least one of: (a) atmospheric pressure, (b) a learned value of concentration of evaporated gas, (c) fuel remaining in the fuel tank, (d) pressure of said part of the purge system before said reintroduction of air, and (e) pressure change in said part of the purge system during leakage diagnosis.

12. A leakage diagnosing method for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said method comprising:

diagnosing existence of leakage in the purge system based on detecting pressure or pressure change in a part of the purge system at least including the fuel tank and the canister if said part of the purge system is hermetically sealed with said cap after introducing air therein;

detecting fuel remaining in said fuel tank;

determining whether said detected fuel remaining is increased; and stopping or canceling said leakage diagnosis if said detected fuel remaining amount is increased.

13. A leakage diagnosing method for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said method comprising:

diagnosing existence of leakage in the purge system based on detecting pressure or pressure change in a part of the purge system at least including the fuel tank and the canister if said part of the purge system is hermetically sealed with said cap after introducing an air therein;

detecting a gear shift position of an automatic transmission;

determining whether said detected shift position is one of a neutral position and a parking position; and stopping or canceling said leakage diagnosis when said detected shift position is one of said neutral position and said parking position.

14. A leakage diagnosing method for an evaporated gas purge system having a fuel tank with a removable cap, an intake pipe for an engine, a passage which connects the fuel tank to the intake pipe, a canister installed in the passage for adsorbing evaporated gas, and a purge control valve installed in the passage for controlling a purge of said adsorbed evaporated gas from the canister to the intake pipe, said method comprising:

tentatively determining existence of leakage in the purge system based on detecting pressure or pressure change in the purge system if the purge system is hermetically sealed with said cap after introducing a positive or negative pressure therein; and performing a confirmatory further leakage diagnosis while an associated vehicle is running if it was earlier determined that leakage exists in the purge system while the vehicle was stopped before determining the probable existence of leakage thus likely eliminating the possibility that said cap was not in place when a leak was earlier detected.

15. A leakage diagnosing method as in claim 14, wherein:

negative pressure is introduced into the purge system while a vehicle is running if said negative pressure has earlier not been able to be introduced into the purge system while said vehicle was stopped before determining the probable existence of leakage thus likely eliminating the possibility that said cap was not in place when a leak was earlier detected.

16. A leakage diagnosing method as in claim 15 wherein:

introducing negative pressure into the fuel tank while a vehicle is running if negative pressure was earlier not able to be introduced into the fuel tank while said vehicle was stopped before determining the probable existence of leakage thus likely eliminating the possibility that said cap was not in place when a leak was earlier detected.

* * * * *